United States Patent Office 3,309,231
Patented Mar. 14, 1967

3,309,231
METHOD OF FORMING A FUEL CELL ELECTRODE
Richard A. Hess, Claymont, Del., assignor to Air Products and Chemicals, Inc., Philadelphia, Pa., a corporation of Delaware, and Northern Natural Gas Company, Omaha, Nebr., a corporation of Delaware
No Drawing. Filed Apr. 5, 1962, Ser. No. 185,192
9 Claims. (Cl. 136—122)

This invention relates to a fuel cell electrode and a method for making the same. The invention is particularly directed to the type of electrode which comprises a body or support of base material to which there is applied metallic material or materials having catalytic properties capable of promoting the desired electrode reaction, the base material being intrinsically porous and/or electroconductive or having either or both of these characteristics supplied by material applied to the base material prior to or along with the application of the catalytic material.

It is known that certain metals from Groups I–B and VIII of the Periodic Table of the Elements have desirable catalytic properties for promoting electrochemical reactions, such as those involved in the generation of electrical energy in fuel cells. Platinum, in particular, when distributed in and upon a porous, electroconductive electrode support, has proved to be highly effective as a catalytic agent in the oxidation of fuels.

I have discovered, however, that when platinum is combined in closely controlled proportion with any of the other noble metals of the groups mentioned, the other metal acts as a promoter, prducing a synergistic effect wherein the catalytic properties of the electrode are enhanced beyond the level attained by either of the combined elements when used alone.

In the formation of a catalytic fuel cell electrode it is common practice to first provide a porous support or body of metallic or carbonaceous base material having electroconductive properties, which may be shaped in the desired final electrode form, and then to apply the selected catalytic material to the base material by any of several known techniques adapted to distribute the catalytic material upon and within the pores of the porous mass forming the electrode element.

Electrodes prepared with the aforementioned individual noble metals as the catalytic agent have been tested for fuel cell use and have displayed varying degrees of catalytic activity. Platinum and palladium, used alone, showed superior catalytic activity, while the others showed lesser activity or substantially none at all for practical purposes.

It was found, however, that combinations of platinum with another of the noble metals of Groups I–B and VIII, when co-deposited on a porous support in predetermined ratio in accordance with the invention, gave even better results than those attained by either of the metals alone. A clear criticality was observed in the relative proportions of co-deposited metals required for the maximum catalytic activity. Optimum results were obtained when the concentration ratio of the platinum and the promoter metal was between about 1:2 and 2:1 molar. Certain of the promoter metals, such as ruthenium and palladium, gave best results when the platinum/promoter metal were combined in a concentration ratio of about 1:2 molar; while gold, on the other hand, exhibited the maximum promotional effect when the platinum and gold were combined in a concentration ratio of about 2:1 molar.

Electrodes having a co-deposit of platinum and one of the other noble metals of the aforementioned groups are effective in both acidic and alkaline fuel cell systems. Hydrogen, for example, is effectively oxidized by such electrodes in either acidic or alkaline electrolytes, and methanol is readily oxidized by such electrodes in an acid system.

In accordance with the invention, a fuel cell electrode is provided in the form of a support or skeleton having a surface adapted for contact with reactant and electrolyte, such support, either in its entirety or at least in the contactable surface region thereof, being porous so as to establish multiple pores providing extensive activatable surface; being catalytically activated upon said extensive surface by chemical deposition of catalytic material adapted to promote the desired electro-chemical reaction; and being electroconductive in order that electrical current may be conducted between the catalytically active surface and a terminal location communicating with an external electrical circuit.

The porous region of the electrode body is catalytically activated by the chemical deposition therein of both platinum and a promoter comprising one of the other noble metals selected from Groups I–B and VIII of the Periodic Table of the Elements. The two metals are initially applied to the porous region of the electrode in the form of aqueous solutions of their respective salts, followed by drying and subsequent reduction of the salts to the individual metals. The aqueous salts may be applied as a mixture and reduced in a prolonged single step or be reduced in a two-step operation, or the aqueous salts may be separately applied and separately reduced.

The metallic salts are supplied in such quantities as to have an equivalent of the metals in the ratio of approximately between 1:2 and 2:1 molar. The porous material is impregnated with the aqueous salt solutions or mixture of salts for a period of time sufficient to effect the optimum distribution of the salt or salts throughout the pores. The impregnated body is then dried to remove most of the water. In a typical drying operation, for example, the body may be oven-dried at about 55–65° C. for a period of between 12–24 hours.

After drying, the salts are reduced to their corresponding metals, preferably by the application of an aqueous solution of a suitable reducing compound or mixture of reducing compounds selected in accordance with the particular combination of metallic salts employed, or by other known methods for reducing noble metal salt. The reduction treatment may be carried out either as a one-step or a two-step operation.

In a single-step reduction the reducing material is maintained in contact with the salt-impregnated porous mass for a period of time sufficient to reduce that one of the two salts which requires the longest reaction time, thus assuring sufficient time for substantially complete reduction of both salts. Such reduction of the metallic salts to their respective metals may generally be accomplished within a period of several hours, such as about 1–3 hours.

In a double-step reduction, each reduction period is timed in accordance with the reaction time requirements of the particular salt being reduced.

Following the reduction treatment, the porous mass or electrode body is thoroughly washed with distilled water to remove undesirable residues of the reaction, such as chlorides and other compounds, if any.

If not initially in finished electrode form, the porous mass may then be shaped to the desired form. Preferably, the electrodes are used immediately while still wet;

if not, they may be in wetted condition until ready for use.

An experimental investigation was carried out in order to determine the activity improvement obtainable by the chemical co-deposition of platinum with each of a selected group of noble metals from Groups I–B and VIII of the Periodic Table of the Elements.

For test purposes, porous electrode supports in the shape of circular discs, $\frac{1}{8}''$ thick and $1\frac{1}{8}''$ in diameter, were cut from a large stock piece of commercially available porous baked carbon. The baked carbon (National Carbon Co.—Grade 60) had an effective porosity of 48 percent and an average pore diameter of 33 microns. The discs were first thoroughly washed with distilled water and then dried in an air oven at 60° C.

A series of such porous carbon discs were then activated to form catalytic fuel cell electrodes by the application thereto of combinations of platinum and each of certain other noble metals selected from Groups I–B and VIII of the Periodic Table of the Elements. Ruthenium, palladium and gold were selected as the promoter materials to combine with platinum.

A series of catalytically-activated test electrodes were prepared by depositing within the pores and upon the exposed surfaces of porous carbon discs individual combination deposits of platinum-ruthenium, platinum-palladium and platinum-gold, as well as individual single deposits of platinum, ruthenium, palladium and gold, for subsequent comparison purposes. In each instance, the desired metal or combination of metals was incorporated into the porous electrode body by impregnation of the latter with aqueous solutions containing compounds of the desired metals, followed by water removal and reduction of the compounds to deposit the pure metal or metals within the pores of the electrode.

Following the activation of the various catalytic electrodes, each was tested in a standard half-cell test unit at 55° C. using 30% aqueous sulfuric acid as the electrolyte to determine the polarization characteristics, that is, the polarization voltage from theoretical for hydrogen, under varying current loads. The method of preparation and the test results for the various electrodes are summarized in the following data obtained from the several experiments.

*Experiment I*

Two porous carbon discs were separately impregnated with chloroplatinic acid solution, each receiving one milliliter of solution, but the relative concentrations of the two solutions were such that one disc received twice as much platinum as the other; four discs were separately impregnated with one-milliliter quantities of aqueous mixtures of ruthenium chloride and chloroplatinic acid in varying proportions; and one disc was impregnated with one milliliter of aqueous ruthenium chloride solution. In each instance a period of one hour was allowed for complete absorption and penetration of the milliliter quantities.

Reduction of the salts to the corresponding pure metals was then effected in the following manner. The discs were dehydrated in an air oven at 60° C. for a period of 16 hours, after which each disc was wetted with a mixture of one milliliter of 34% aqueous potassium hydroxide and one-half milliliter of absolute methanol and permitted to stand for one hour. Each disc was then impregnated with one milliliter of reagent grade formic acid and permitted to stand for two hours.

The discs were then washed chloride free with distilled water to complete their conditioning for electrode use and, while still wet, the catalytically-activated electrodes thus formed were stored in a sealed container until they could be accommodated in the helf-cell test unit.

Upon subsequent testing in the half-cell test unit, at 55° C. and with 30 percent sulfuric acid solution as the electrolyte and methanol as the fuel, the following data were obtained.

| Disc No. | Pt, mg./cm.² | Ru, mg./cm.² | Polarization (v.) vs. Theoretical (H₂) | | | | |
|---|---|---|---|---|---|---|---|
| | | | Current Density, ma./cm.² | | | | |
| | | | Open Circuit | 10 | 25 | 50 | 100 |
| 1 | 1.5 | None | .21 | .60 | .68 | .78 | — |
| 2 | 3.0 | None | .23 | .59 | .65 | .76 | — |
| 3 | 1.5 | 0.16 | .26 | .55 | .64 | .75 | — |
| 4 | 1.5 | 0.65 | .20 | .48 | .56 | .67 | .87 |
| 5 | 1.5 | 1.5 | .25 | .43 | .53 | .63 | .79 |
| 6 | 1.5 | 3.5 | .25 | .58 | .82 | — | — |
| 7 | 1.5 | 13.5 | .27 | .79 | — | — | — |
| 8 | None | 1.5 | .77 | — | — | — | — |

NOTE: (—) denotes no data, complete polarization.

The foregoing experimental data show that only two discs, Nos. 4 and 5 were able to handle a current density of 100 ma./cm.² without complete polarization. The optimum result was obtained with disc No. 5, containing equal amounts (1.5 mg./cm.²) of platinum and ruthenium, since it showed a polarization from theoretical of only 0.79 v. at 100 ma./cm.². Ruthenium, used alone, gave the poorest performance, showing complete depolarization at a current density of 10 ma./cm.².

*Experiment II*

Five porous carbon discs were separately impregnated with one-milliliter quantities of aqueous palladium chloride solutions of various concentrations. A period of one hour was allowed for complete absorption and penetration of the one milliliter of solution. The discs were then dehydrated in an air oven at 60° C. for a period of 16 hours, after which the discs were wetted with 0.1 N sodium bicarbonate in amounts slightly less than stoichiometric and corresponding to 0.18 milliliter per milligram of palladium in order to form the hydrous oxide of palladium by neutralization of the chloride.

The discs were again dehydrated at 60° C. for 16 hours, after which four of the discs were each impregnated with one milliliter of an aqueous solution of chloroplatinic acid containing 10 milligrams of platinum, and the discs were permitted to stand for one hour.

Once again, the four platinum-impregnated discs were dehydrated at 60° C. for 16 hours, after which all five impregnated discs were separately reduced with one milliliter of a 3.1 pH potassium formate solution prepared by neutralizing reagent grade formic acid with 34 percent potassium hydroxide.

After standing for 3 hours, the five discs were washed chloride free with distilled water to complete their conditioning for electrode use and, while still wet, the catalytically-activated electrodes thus formed were stored in a sealed container until needed.

Upon subsequent testing in the half-cell test unit, at 55° C. and with 30 percent sulfuric acid solution as the electrolyte and methanol as the fuel, the following data were obtained:

| Disc No. | Pt, mg./cm.² | Pd, mg./cm.² | Polarization (v.) vs. Theoretical (H₂) | | | | |
|---|---|---|---|---|---|---|---|
| | | | Current Density, ma./cm.² | | | | |
| | | | Open Circuit | 10 | 25 | 50 | 100 |
| 1 | 1.5 | 0.75 | (*) | .65 | .76 | — | — |
| 2 | 1.5 | 1.5 | .09 | .47 | .52 | .60 | .76 |
| 3 | 1.5 | 2.7 | .20 | .57 | .63 | .70 | .85 |
| 4 | 1.5 | 4.5 | .39 | .60 | .65 | .71 | .85 |
| 5 | None | 1.5 | .22 | — | — | — | — |

NOTE: (—) denotes no data, complete polarization.
(*) denotes no data taken.

In this experiment, three of the discs, Nos. 2, 3 and 4, were able to handle a current density of 100 ma./cm.² without complete polarization. The optimum result was obtained with disc No. 2, containing equal amounts (1.5 mg./cm.²) of platinum and palladium, since it showed a polarization from theoretical of only 0.76 v. at 100 ma./cm.². Palladium, used along, gave the poorest performance, showing complete depolarization at a current density of 10 ma./cm.².

*Experiment III*

Five porous carbon discs were separately impregnated with one-milliliter quantities of aqueous chlorauric acid solutions of various concentrations. A period of one hour was allowed for complete absorption and penetration of the one milliliter of solution. The discs were then dehydrated in an air oven at 60° C. for a period of 16 hours, after which the chloride was reduced by the addition to each disc of one milliliter of 3.1 pH potassium formate solution prepared by neutralizing reagent grade formic acid with 34 percent potassium hydroxide.

After standing for 3 hours, the five discs were again dehydrated at 60° C. for 16 hours, after which four of the discs were each impregnated with one milliliter of an aqueous solution of chloroplatinic acid containing 10 milligrams of platinum and the discs were permitted to stand for one hour.

The four platinum impregnated discs were dehydrated at 60° C. for 16 hours, after which all four were reduced by the addition to each of one milliliter of the 3.1 pH potassium formate solution. After standing for 3 hours, the four discs impregnated with both gold and platinum and the single disc impregnated with gold alone were washed chloride free with distilled water, and the catalytically-activated electrodes thus formed were stored in a sealed container until needed.

Upon subsequent testing in the half-cell test unit, at 55° C. and with 30 percent sulfuric acid solution as the electrolyte and methanol as the fuel, the following data were obtained:

| Disc No. | Pt, mg./cm.² | Au, mg./cm.² | Polarization (v.) vs. Theoretical ($H_2$) | | | | |
|---|---|---|---|---|---|---|---|
| | | | Current Density, ma./cm.² | | | | |
| | | | Open Circuit | 10 | 25 | 50 | 100 |
| 1 | 1.5 | 0.45 | .43 | .63 | .66 | .69 | .73 |
| 2 | 1.5 | 0.75 | .25 | .56 | .59 | .61 | .63 |
| 3 | 1.5 | 1.5 | .38 | .59 | .62 | .65 | .68 |
| 4 | 1.5 | 3.0 | .26 | .67 | .77 | .93 | — |
| 5 | None | 0.75 | .52 | — | — | — | — |

NOTE: (—) denotes no data, complete polarization.

While again, several of the discs were able to handle current densities up to 100 ma./cm.² without complete polarization, disc No. 2, containing twice as much platinum as gold (1.5–0.75 mg./cm.²) gave the optimum result. This disc showed a polarization of only 0.63 v. at 100 ma./cm.². Gold, used alone, gave the poorest performance, showing complete depolarization at a current density of 10 ma./cm.².

The foregoing experimental data clearly demonstrate the synergistic effect obtained by chemically co-depositing upon a porous electro-conductive support or base electrode a noble metal, such as platinum, of known outstanding catalytic ability in fuel cell reactions, together with a promoter metal selected from the noble metals of Groups I–B and VIII of the Periodic Table of the Elements.

The polarization data obtained by the tests performed in the half-cell test unit show the importance of achieving an optimum ratio between the amounts of platinum and promoter metal incorporated in the electrode. The criticality of such ratio is clearly demonstrated by the experiments performed.

In each experiment it was demonstrated that the co-deposition of platinum and the selected promoter metal provided catalytic activity considerably superior to that obtained by the use of either of the co-deposited metals used alone as the sole catalytic material.

Although the recorded experimental data give the actual weight of metal deposited per unit area of the baked carbon discs, the relative amounts of the respective co-deposited metals are readily expressed on a molar basis by reference to the known molecular weights. Thus, in the case of platinum combined with ruthenium and palladium as promoter metals, the data show an optimum platinum-promoter metal ratio of 1:2 molar, while the data for gold as a promoter metal show an optimum platinum-promoter metal ratio of 2:1 molar. From the known characteristics of the other noble metals in the Periodic Table Groups specified it is believed that the optimum ratio for combining platinum with such other metals will fall within the approximate range of ratios indicated for ruthenium, palladium and gold. It is contemplated that the optimum combination ratio of platinum with the other noble metals of Groups I–B and VIII of the Periodic Table of the Elements will fall approximately within the range of 1:2 to 2:1 molar.

While the practicability of the invention has been experimentally demonstrated by testing in an acid system with methanol as the fuel, it is contemplated that electrodes prepared in accordance with the invention will be adapted for use in either acidic or basic systems for the oxidation of various gaseous or liquid fuels.

Obviously many modifications and variations of the invention as hereinbefore set forth may be made without departing from the spirit and scope thereof, and therefore only such limitations should be imposed as are indicated in the appended claims.

What is claimed is:

1. The method of forming a fuel cell electrode which comprises the steps of:
   (a) impregnating a porous, electro-conductive, baked carbon support with aqueous solutions of both a platinum compound and a compound of another noble metal selected as a promoter metal from Groups I–B and VIII of the Periodic Table of the Elements, in a ratio of approximately between 1:2 and 2:1 molar, said platinum and promoter metal compounds being supplied to said support in such amounts as to provide up to about 1.5 milligrams of each metal per square centimeter of the carbon support, and said impregnation continuing for a period of time sufficient to effect the optimum distribution of said compounds throughout the pores of said support;
   (b) drying said impregnated support to remove the water;
   (c) chemically reducing said noble metal compounds to precipitate the corresponding pure metals upon the outer surface and throughout the pores of said support;
   (d) and washing the resultant metal-impregnated support.

2. The method of claim 1 in which said impregnation of said support with said platinum and promoter metal compounds is accomplished by adding said compounds as an aqueous mixture.

3. The method of claim 2 in which said promoter metal is ruthenium, combined in a platinum-ruthenium ratio of about 1:2 molar.

4. The method of claim 2 in which said reduction of platinum and promoter metal compounds is effected by addition of an aqueous solution of potassium hydroxide and methanol, followed by addition of reagent grade formic acid.

5. The method of claim 1 in which said promoter metal is palladium, combined in a platinum-palladium ratio of about 1:2 molar, and said impregnation of said support with said platinum and palladium compounds is accomplished in successive steps, first, by addition of the palladium compound, followed by neutralization to form the hydrous oxide of palladium and drying, then by addition of the platinum compound, followed by drying and reduction.

6. The method of claim 5 in which said palladinum compound is the chloride and said platinum compounds is chloroplatinic acid, and in which said neutralization of the palladium chloride is effected by addition of a slightly less than stochiometric amount of sodium bicarbonate.

7. The method of claim 5 in which said reduction is effected by addition of acidic potassium formate solution.

8. The method of claim 1 in which said promoter metal is gold, combined in a platinum-gold ratio of about 2:1 molar, and said impregnation of said support with said platinum and gold compounds is accomplished in successive steps, first, by addition of the gold compound, followed by drying and reduction with acidic potassium formate solution, then by addition of the platinum compound, followed by drying and reduction with an additional amount of said acidic potassium formate solution.

9. The method of claim 8 in which said gold compound is chlorauric acid and said platinum compound is chloroplatinic acid.

References Cited by the Examiner
UNITED STATES PATENTS

| | | | |
|---|---|---|---|
| 1,916,249 | 7/1933 | Barker | 252—474 |
| 2,615,932 | 10/1952 | Marko et al. | 136—122 |
| 2,863,762 | 12/1958 | Pullen | 75—108 |
| 3,092,517 | 6/1963 | Oswin | 136—86 |
| 3,098,762 | 7/1963 | Roblee et al. | 136—120 |
| 3,116,165 | 12/1963 | Hipp | 136—120 |
| 3,131,223 | 4/1964 | Smidt et al. | 252—474 |
| 3,160,530 | 12/1964 | Witherspoon | 136—120 |
| 3,172,074 | 3/1965 | Drewes et al. | 117—227 |

FOREIGN PATENTS

| | | |
|---|---|---|
| 233,847 | 3/1960 | Australia. |

OTHER REFERENCES

Chemical Abstracts, vol. 56, 1962, vol. 5752.

JOHN H. MACK, *Primary Examiner.*

JOHN R. SPECK, *Examiner.*

W. VAN SISE, *Assistant Examiner.*